US011321239B2

(12) United States Patent
Morgenstern et al.

(10) Patent No.: US 11,321,239 B2
(45) Date of Patent: May 3, 2022

(54) DYNAMICALLY JOINING AND SPLITTING DYNAMIC ADDRESS TRANSLATION (DAT) TABLES BASED ON OPERATIONAL CONTEXT

(71) Applicant: INTERNATIONAL BUSINESS MACHINES CORPORATION, Armonk, NY (US)

(72) Inventors: Harris M. Morgenstern, Wappingers Falls, NY (US); Elpida Tzortzatos, Lagrangeville, NY (US); Scott B. Compton, Hyde Park, NY (US); Steven M. Partlow, Beacon, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/128,664

(22) Filed: Dec. 21, 2020

(65) Prior Publication Data
US 2021/0109863 A1    Apr. 15, 2021

Related U.S. Application Data

(63) Continuation of application No. 16/456,075, filed on Jun. 28, 2019, now Pat. No. 10,891,238.

(51) Int. Cl.
*G06F 12/1009* (2016.01)
(52) U.S. Cl.
CPC .... *G06F 12/1009* (2013.01); *G06F 2212/657* (2013.01)

(58) Field of Classification Search
CPC .......... G06F 12/1009; G06F 2212/657; G06F 2212/1016; G06F 12/08; G06F 12/109
See application file for complete search history.

(56) References Cited

U.S. PATENT DOCUMENTS

| | | | | |
|---|---|---|---|---|
| 4,945,480 A ‡ | 7/1990 | Clark | ...................... | G06F 9/468 711/6 |
| 5,023,773 A ‡ | 6/1991 | Baum | ...................... | G06F 9/468 710/22 |

(Continued)

FOREIGN PATENT DOCUMENTS

| | | | | |
|---|---|---|---|---|
| EP | 1168158 A2 ‡ | 1/2002 | ............. | G06F 9/462 |
| EP | 1168158 A2 | 1/2002 | | |

OTHER PUBLICATIONS

IBM; "Method and System for dynamic extensible process address space (process address space virtualization)"; An IP.com Prior Art Database Technical Disclosure: IPCOM000187697D; Sep. 16, 2009; 4 pages.‡

(Continued)

*Primary Examiner* — Sean D Rossiter
(74) *Attorney, Agent, or Firm* — Cantor Colburn LLP; Teddi Maranzano (57) ABSTRACT

An aspect includes determining, via a processor, context attributes of a storage. Data address translation (DAT) tables are created, via the processor, to map virtual addresses to real addresses within the storage. When detecting, via the processor, that a context attribute of the storage has changed, and the DAT tables are updated based at least in part on the changed context attributes of the storage.

20 Claims, 5 Drawing Sheets

(56) References Cited

U.S. PATENT DOCUMENTS

| | | | | |
|---|---|---|---|---|
| 5,220,669 | A ‡ | 6/1993 | Baum | G06F 9/30076 718/10 |
| 5,361,356 | A ‡ | 11/1994 | Clark | G06F 9/30003 711/20 |
| 5,745,676 | A ‡ | 4/1998 | Hobson | G06F 9/468 711/16 |
| 5,873,128 | A ‡ | 2/1999 | Kimura | G06F 12/1009 711/20 |
| 5,923,864 | A ‡ | 7/1999 | Inoue | G06F 12/1036 711/20 |
| 6,286,089 | B1 ‡ | 9/2001 | Greiner | G06F 12/1072 711/20 |
| 6,553,477 | B1 ‡ | 4/2003 | Krishna | G06F 12/1027 700/20 |
| 6,976,255 | B1 ‡ | 12/2005 | Clark | G06F 9/5016 711/20 |
| 7,555,628 | B2 ‡ | 6/2009 | Bennett | G06F 12/1027 711/20 |
| 9,576,031 | B1 ‡ | 2/2017 | Aggarwal | G06K 9/6232 |
| 9,792,160 | B2 ‡ | 10/2017 | Shear | G06F 9/5083 |
| 10,075,384 | B2 ‡ | 9/2018 | Shear | H04L 47/70 |
| 2005/0257030 | A1 ‡ | 11/2005 | Langhammer | G06F 15/7867 712/22 |
| 2006/0026384 | A1 ‡ | 2/2006 | Brandt | G06F 12/12 711/20 |
| 2007/0067602 | A1 ‡ | 3/2007 | Callister | G06F 12/0842 711/20 |
| 2009/0217098 | A1 | 8/2009 | Farrell et al. | |
| 2010/0185831 | A1 ‡ | 7/2010 | Iguchi | G06F 12/1027 711/20 |
| 2010/0313201 | A1 ‡ | 12/2010 | Warton | G06F 12/1027 718/1 |
| 2012/0072669 | A1 ‡ | 3/2012 | Nishiguchi | G06F 12/1027 711/13 |
| 2013/0339562 | A1 | 12/2013 | Greiner et al. | |
| 2014/0068137 | A1* | 3/2014 | Kegel | G06F 12/109 711/6 |
| 2014/0181463 | A1 | 6/2014 | Greiner et al. | |
| 2014/0208059 | A1 ‡ | 7/2014 | Kogge | G06F 12/0692 711/20 |
| 2015/0089184 | A1 ‡ | 3/2015 | Mukherjee | G06F 9/5077 711/20 |
| 2015/0301950 | A1 ‡ | 10/2015 | Bybell | G06F 9/5077 711/20 |
| 2015/0301951 | A1 ‡ | 10/2015 | Bybell | G06F 12/1036 711/20 |
| 2018/0060121 | A1 ‡ | 3/2018 | Nassi | G06F 9/3855 |
| 2018/0191872 | A1* | 7/2018 | Sarikaya | H04L 12/46 |
| 2018/0373561 | A1 ‡ | 12/2018 | Nassi | G06F 9/5077 |
| 2019/0104127 | A1* | 4/2019 | Da Silva Peixoto | H04L 63/0876 |
| 2019/0163643 | A1 | 5/2019 | Yang | |
| 2019/0205261 | A1 ‡ | 7/2019 | Cheriton | G06F 12/1036 |
| 2020/0409857 | A1 | 12/2020 | Tzortzatos et al. | |
| 2020/0409861 | A1 | 12/2020 | Tzortzatos et al. | |
| 2020/0409862 | A1 | 12/2020 | Morgenstern | |
| 2020/0409865 | A1 | 12/2020 | Tzortzatos | |

OTHER PUBLICATIONS

List of IBM Patents or Patent Applications Treated as Related; Date Filed: Jul. 1, 2019; 2 pages.‡

IBM; "A Materialized View Management System and Method to Scale up Classification and Dynamic Extension in Practical ORM System Loosely Coupled with Ontology Repository"; IP.com: IPCOM000168011D; Feb. 28, 2008; 7 pages.‡

Tzortzatos et al.; "Access To Dynamic Address Translation Across Multiple Spaces for Operational Context Subspaces"; U.S. Appl. No. 16/456,006, filed Jun. 28, 2019.‡

Tzortzatos et al.; "Operational Context Subspaces"; U.S. Appl. No. 16/456,000, filed Jun. 28, 2019.‡

Tzortzatos et al., "Private Space Control Within a Common Address Space"; U.S. Appl. No. 16/456,084, filed Jun. 28, 2019.‡

Anonymous; "GRC Integration Protocol"; An IP.com Prior Art Database Techinical Disclosure: IPCOM000232450D; Nov. 11, 2013; 8 pages.‡

Anonymous; "System and Method for Clustering ensuring Convexity in Subspaces;" An IP.com Prior Art Database Techinical Disclosure: IPCOMM000233885D; Dec. 26, 2013; 4 pages.‡

Anonymous; "Share Maps: An Application Independent Mechanism for Socially Combining Network Domains"; An IP.com Prior Art Database Technical Disclosure: IPCOM000243494D; Sep. 24, 2015; 5 pages.‡

Anonymous; "Database Optimizer Based on Column Usage-Context"; An IP.com Prior Art Database Technical Disclosure: IPCOM000246232D; May 18, 2016; 4 pages.‡

Anonymous; "Chapter 15: Memory Mapping and DMA"; Memory Management in Linux; Jan. 21, 2005, 52 pages.‡

Linux "Context Switch Definition" online indexed on Feb. 18, 2010, [retrieved on Feb. 16, 2021]. Retrieved from the Internet:<URL:https://web.archive.org/web/20100218115342/http://www.linfo.org/context_switch.html> (Year 2010).

List of IBM Patents or Patent Applications Treated as Related; Date Filed: Apr. 2, 2021; 2 pages.

IBM; "A Materialized View Management System and Method to Scale up Classification and Dynamic Extension in Pactical ORM System Loosely Coupled with Ontology Repository"; IP.com: IPCOM000168011D; Feb. 28, 2008; 7 pages.

List of IBM Patents or Patent Applications Treated as Related; Date Filed: Dec. 28, 2020; 2 pages.

Morgenstern et al.; "Dynamically Joining and Splitting Dynamic Address Translation (DAT) Tables Based On Operational Context"; U.S. Appl. No. 16/456,075, filed Jun. 28, 2019.

Salla et al. "IBM Redbook ABCs of zOS vol. 10", May 4, 2018 [retrieved Oct. 16, 2020]. Retrived from the internet: <URL: http://redbooks.ibm.com/abstracts/SG246990.html> (Year: 2018).

\* cited by examiner
‡ imported from a related application

DYNAMICALLY JOINING AND SPLITTING DYNAMIC ADDRESS TRANSLATION (DAT) TABLES BASED ON OPERATIONAL CONTEXT

DOMESTIC PRIORITY

This application is a continuation of U.S. patent application Ser. No. 16/456,075, filed Jun. 28, 2019, the disclosure of which is incorporated by reference herein in its entirety.

BACKGROUND

The present invention relates to a highly configurable memory architecture, and more specifically, to a highly configurable memory architecture for dynamically joining and splitting dynamic address translation (DAT) tables based on operational context.

SUMMARY

According to an embodiment of the present invention, a computer-implemented method includes determining, via a processor, context attributes of a storage. Data address translation (DAT) tables are created, via the processor, to map virtual addresses to real addresses within the storage. When detecting, via the processor, that a context attribute of the storage has changed, and the DAT tables are updated based at least in part on the changed context attributes of the storage.

Other embodiments of the present invention implement features of the above-described method in computer systems and computer program products.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

One or more embodiments of the present invention are used to allow dynamically joining or splitting dynamic address translation (DAT) tables within virtual memory.

According to embodiments of the present invention, a computer-implemented method includes the ability to manage two sets of radix tree based dynamic address translation (DAT) tables where one is used to facilitate access of all allocated storage in an address space, while the other permits access to a subset of the storage. The former is referred to as the full space and the latter as the partial space.

All operating systems provide an abstraction called an address space. The address space provides a linear range of storage to an application program, isolating the application from other applications that run in other address spaces. Operating systems create multiple address spaces to run multiple application programs concurrently in isolation where each application has the illusion of having control over the system. The illusion of a single address space in isolation is made possible by virtual memory.

Virtual memory is implemented through a process called dynamic address translation (DAT). DAT is a function that takes as input a virtual address and returns a real address or a fault if the page associated with the virtual address is not backed in real memory. One possible implementation of virtual memory, the one that will be the focus of this disclosure involves the use and management of a radix-tree DAT table which is a hierarchical tree structure indexed by the input virtual address. The operating system's role is to create the DAT tables while the memory management function of the CPU is to use it to perform the actual translation of a virtual to a real address.

In the course of managing application programs, the operating system may need to create a data area within the address space. Such data may require privileged access, meaning that the application program should not be able to access it. It is also possible that different parts of the application run at different levels of trust and that the part of the application that is most trusted should have access to the entire address space while the part that is less trusted only has access to a subset of the address space. The subset of the address space used by non-trusted programs is referred to as the "partial space" while the entire spaces is referred to as the "full space". Thus, access to a virtual address that is mapped in the full space but not in the partial will result in a memory fault for an untrusted application whereas it will be translated to a real address for a trusted application or the operating system. Since the partial space is a subset of the full space, to minimize the amount of storage required for the DAT tables, some level DAT table sharing can occur. This invention describes how the radix-tree DAT tables are managed to maintain two different views of the same address space based on the privilege (operational context) of the current unit of work. The highest levels of the DAT tables for the full and partial spaces are unique, but the lowest level, the page table, may either be "joined" or "split". A joined page table is simply one that is used by both the full and partial spaces. In short, the memory mapped by a joined page table is accessible by an application running in either space. A split page table is one that is not shared between the full and partial spaces because there are one or more pages visible in the full space that should not be visible in the partial space.

Figure 1:
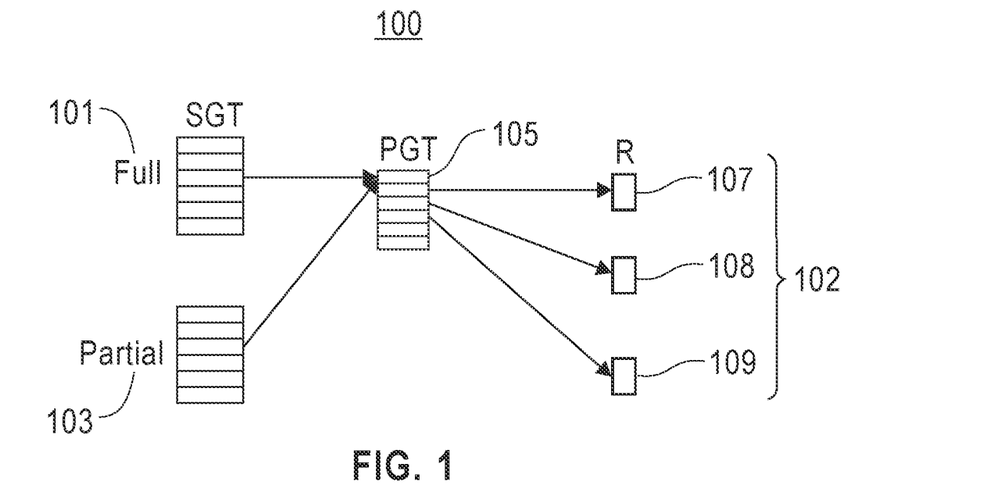
FIG. 1 illustrates a dynamic address translation (DAT) structure according to one or more embodiments of the present invention.

Turning now to a more detailed description of aspects of the invention, FIG. 1 depicts a joined DAT structure 100 according to one or more embodiments of the present invention includes a multi-level or radix-tree memory structure. In the z/Series IBM computer architecture such a DAT table consists of five levels: three region tables, a segment table and a page table, in order of highest to lowest. The region tables are not shown in any of diagrams as they are not relevant to the invention. All of the DAT structures down to the segment table are unique for both the full and partial spaces. The joined DAT structure 100 includes a full segment table (SGT) 101 and a partial SGT 103. FIG. 1 also depicts a page table (PGT) 105 and a plurality of entries R 102 within the PGT (107, 108, 109) that contain the real addresses of frames in the computer's main (real) memory.

Figure 2:
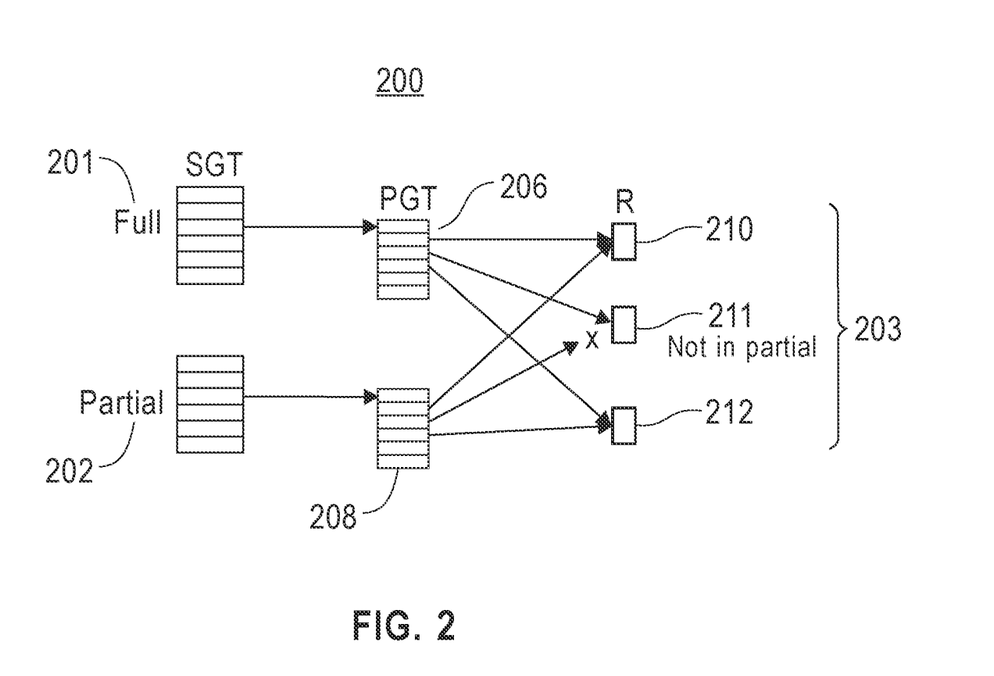
FIG. 2 illustrates another DAT structure according to one or more embodiments of the present invention.

Referring to FIG. 2, a split DAT structure 200 is shown according to one or more embodiments of the present invention. The split DAT structure 200 shown in FIG. 2 includes a multi-level (radix-tree) structure showing a full SGT 201 and a partial SGT 202. The split DAT structure 200 also includes a PGT full table 206, a PGT partial table 208, and a plurality of entries R 203 which contain the addresses of frames in real memory (210, 211, 212) or a bit indicating the entry is invalid. Both 210 and 212 are mapped into the full and partial spaces. However, 211 is only mapped into the full space; the invalid bit is set in the mapping in the partial space. The full page table 206 and partial page table 208 are peer page tables in that they both provide a mapping of the same segment of storage where the latter maps a subset of the former. Pointer to peer tables, and indications of either partial, joined or not joinable are associated with both the PGT full table 206 and the PGT partial table 208. This information may be maintained in an associated data structure, for example, the page frame table entries of the frames that back the page tables may contain this information. The page frame table entries may also record the relationship between peer tables, where the full table points to the partial and the partial points to the full.

Some of the management of DAT tables is performed when the application or the operating system invokes an API to allocate a page of memory. When the segment is not mapped (no page table exists) and the first request is for non-privileged storage, a joined Page Table is created to map the page. Subsequently, if the operating system were to request privileged storage in the same segment, the joined page table would be split into a full space PGT which would provide access to the privileged storage. The partial space will lose access to the segment and all the storage it makes visible until subsequent DAT faults. On the other hand, if the operating system were the first to allocate privileged storage in a segment, a PGT will be created to provide a map for the full space ONLY and the PGT will be marked as "not-joinable" since non-privileged units of work are not eligible to access all the storage that it maps.

Figure 3:
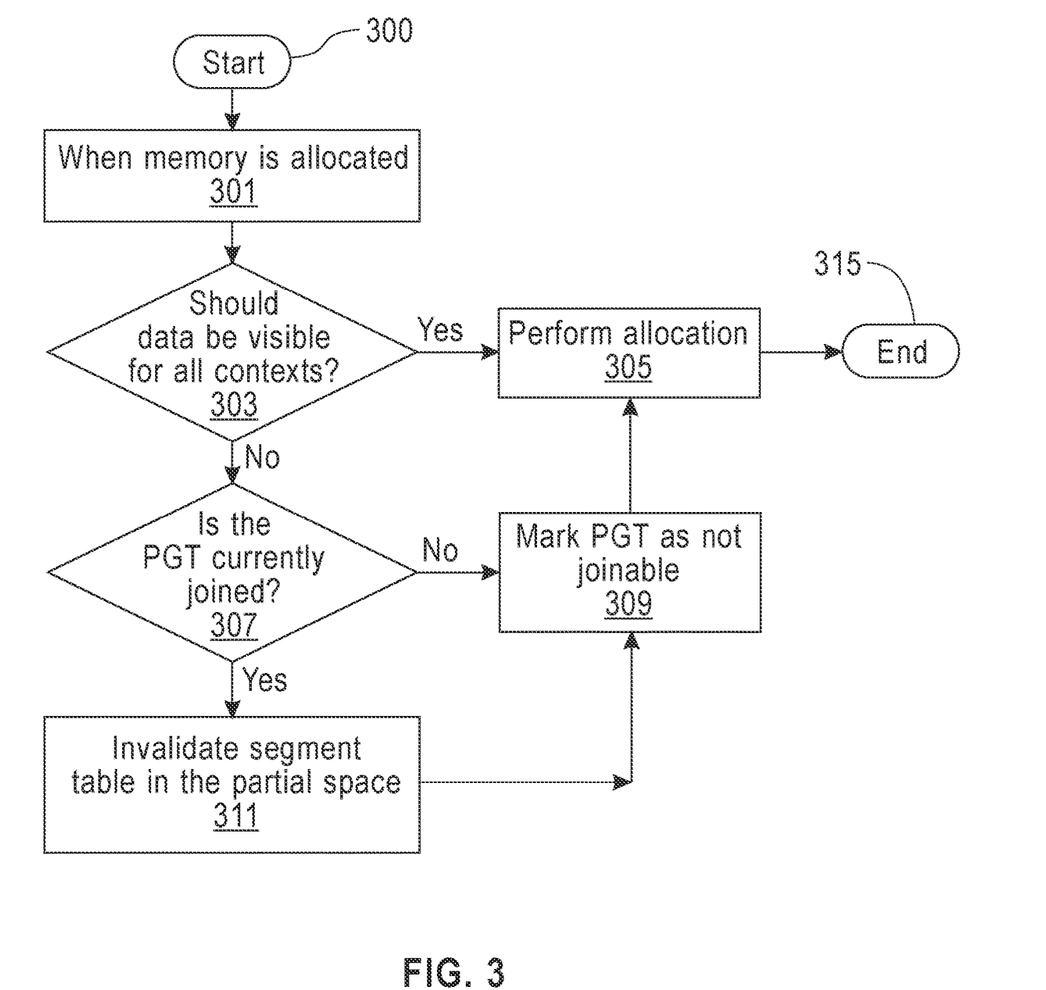
FIG. 3 illustrates a flow diagram of a process according to one or more embodiments of the present invention.

Referring now to FIG. 3, a memory allocation flow is generally depicted in accordance with one or more embodiments of the present invention. The process begins at block 300, and proceeds with assigning memory to be allocated at block 301 and determining if the full data should be visible for all contexts at block 303. If it is determined at block 303 that the full data should be visible in both the full and partial spaces, then the data is allocated at block 305. If the buffer being allocated should not be visible in the partial space, then the process determines if a page table (PGT) is currently joined at block 307. If the page table is not joined, then the page table is marked not joinable at block 309 and the buffer is allocated at block 305. If it is determined at block 307 that the page table is joined, then the page table is split by invalidating the segment table entry that points to the joined page table in the partial segment table. The page table is marked as not joinable (block 311) and the memory allocation is performed using just the split page table. At this point, the partial space has lost access to the segment of memory that has been split since there is no corresponding partial page table that has been created. The full space segment table entry maintains access to the segment. Subsequent references to storage mapped by the invalidated segment will result in a segment fault (FIG. 4). An alternative design for splitting a page table is to make an exact copy of the page table before the memory request proceeds and use it to validate the segment in the partial space. Taking this approach will avoid subsequent segment faults for existing allocated memory mapped by the segment for units of work running in the partial space. Then, the PGT table is marked not joinable at block 309 and current allocation continues 305.

Figure 4:
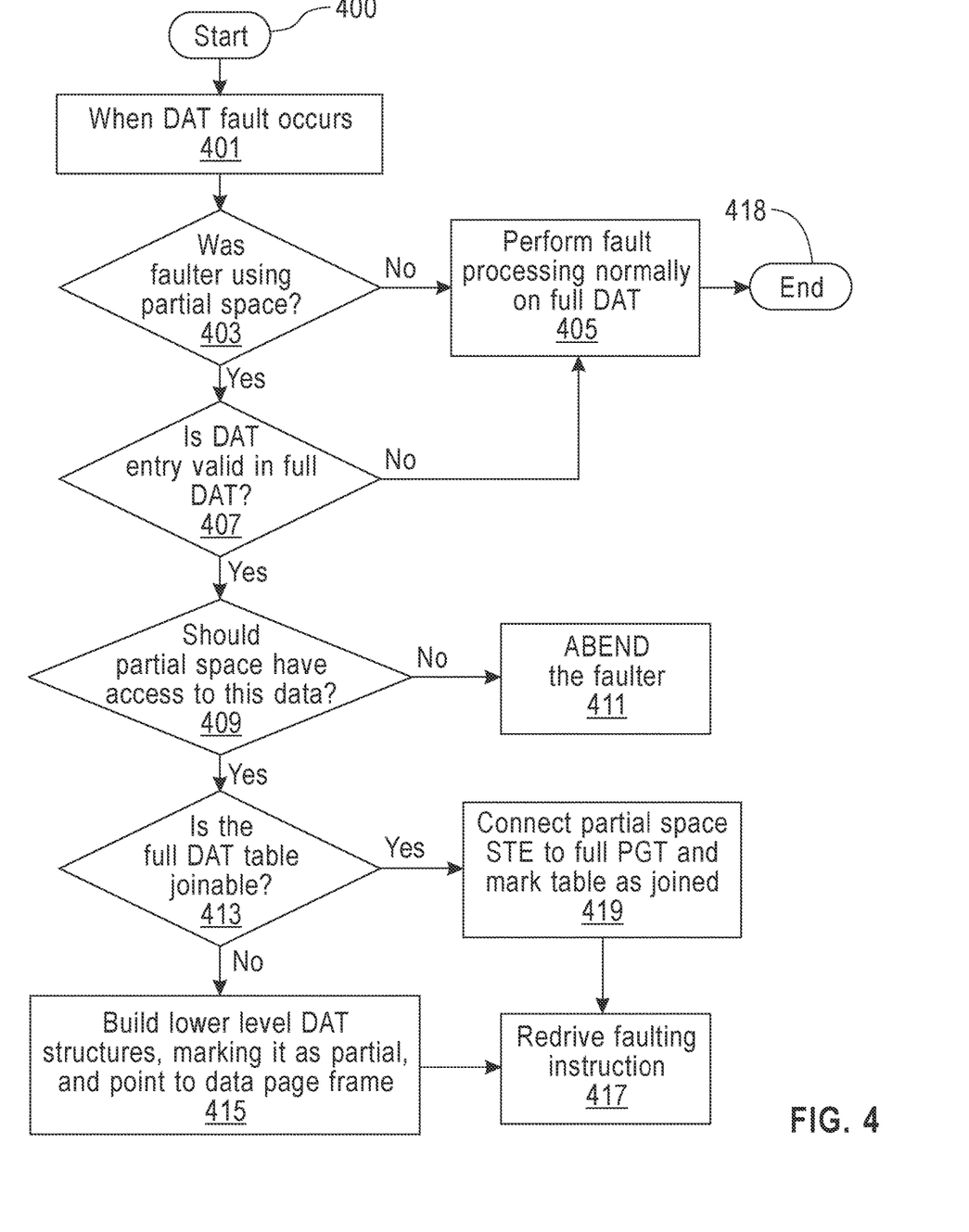
FIG. 4 illustrates another flow diagram of a process according to one or more embodiments of the present invention.

A DAT fault is a hardware interrupt that is issued when an application references storage that is not valid (mapped) in real. A segment fault is a type of DAT fault where the segment table exists, but the segment entry mapping the virtual address is invalid. Referring to FIG. 4, a segment fault flow diagram is generally shown in accordance with one or more embodiments of the present invention. As described in FIG. 3, when a split of a page table is performed, the partial space loses access to the data in the segment, a subset of which it should be able to access. The following describes how this is corrected during segment fault processing. The segment fault flow process starts at block 400 when a segment fault occurs at block 401. It is possible that the reference is legal, meaning that the storage was previously allocated (FIG. 3) and that the faulter has access to the storage. If the reference is invalid, then the faulter will be abnormally terminated (abended). Segment fault processing determines if the segment faulter was using the partial space at block 403. If the DAT faulter was not using the partial space of memory at block 403, the process performs the fault processing normally on the full DAT at block 405. If the segment faulter was using the partial space of the memory at block 403, then if the partial space should not have access to the storage, the faulter is abended at block 411. Otherwise, if the page table mapping the full space segment is joinable, then the partial space segment is validated with the full space page table which will be marked as joined at block 419. Otherwise, if the full space page table is not joinable, then a new partial space page table is built to map the segment at block 415 and is marked as "partial". The fault process is then redriven with the new DAT structures in place at block 417. By making a page table joined instead of split, the operating system saves memory since there is only 1 joined page table instead of 1 for the full and another for the partial.

The process of managing segment tables and page tables in the above discussion is applicable to higher level DAT tables. Both FIG. 3 and FIG. 4 could be changed to use Region $3^{rd}$ table and Segment Tables for example, as described in zSeries Architecture (see Principles of Operation), instead of Segment Tables and Page Tables. In this case, the Segment tables would be joined or split. Region 2nd/3rd and Region 2nd/Region $1^{st}$ could also be managed in a similar manner.

Figure 5:
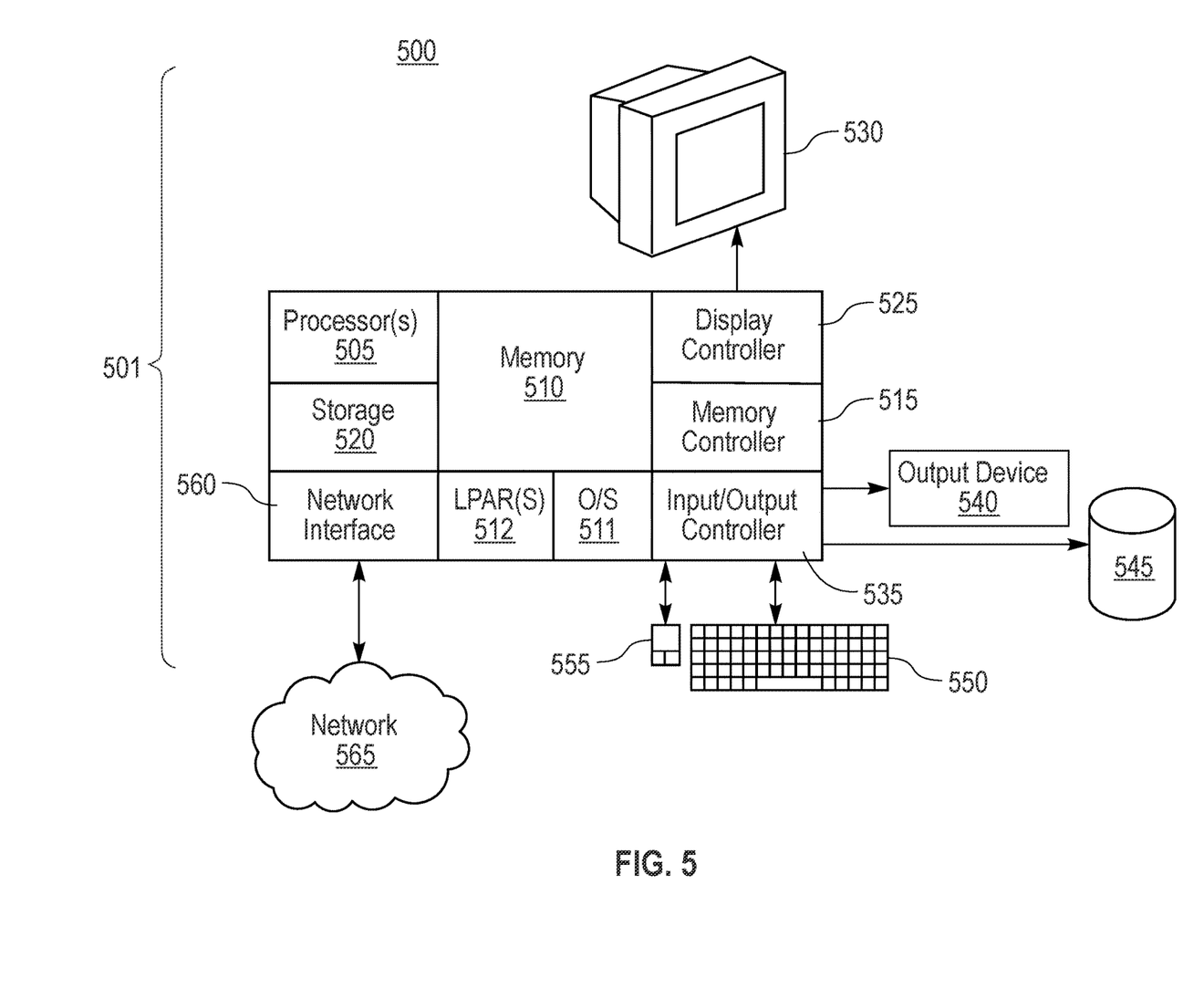
FIG. 5 illustrates a computer system according to one or more embodiments of the present invention.

Turning now to FIG. 5, a computer system 500 for controlling DAT tables based on the context attributes of storage is generally shown in accordance with one or more embodiments of the present invention. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 500 therefore may include general-purpose computer or mainframe 501 capable of running multiple instances of an O/S simultaneously.

In an exemplary embodiment, in terms of hardware architecture, as shown in FIG. 5, the computer 501 includes one or more processors 505, memory 510 coupled to a memory controller 515, and one or more input and/or output (I/O)

devices 540, 545 (or peripherals) that are communicatively coupled via a local input/output controller 535. The input/output controller 535 can be, for example but not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 535 may include a plurality of sub-channels configured to access the output devices 540 and 545. The sub-channels may include fiber-optic communications ports.

The processor 505 is a hardware device for executing software, particularly that stored in storage 520, such as cache storage, or memory 510. The processor 505 can be any custom made or commercially available processor, a central processing unit (CPU), an auxiliary processor among several processors associated with the computer 501, a semiconductor based microprocessor (in the form of a microchip or chip set), a macroprocessor, or generally any device for executing instructions.

The memory 510 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 510 can have a distributed architecture, where various components are situated remote from one another, but can be accessed by the processor 505.

The instructions in memory 510 may include one or more separate programs, each of which comprises an ordered listing of executable instructions for implementing logical functions. In the example of FIG. 5, the instructions in the memory 510 a suitable operating system (OS) 511. The operating system 511 essentially controls the execution of other computer programs and provides scheduling, input-output control, file and data management, memory management, and communication control and related services.

The memory 510 may include multiple logical partitions (LPARs) 512, each running an instance of an operating system. The LPARs 512 may be managed by a hypervisor, which may be a program stored in memory 510 and executed by the processor 505.

In an exemplary embodiment, a conventional keyboard 550 and mouse 555 can be coupled to the input/output controller 535. Other output devices such as the I/O devices 540, 545 may include input devices, for example but not limited to a printer, a scanner, microphone, and the like. Finally, the I/O devices 540, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 500 can further include a display controller 525 coupled to a display 530. In an exemplary embodiment, the system 500 can further include a network interface 560 for coupling to a network 565. The network 565 can be an IP-based network for communication between the computer 501 and any external server, client and the like via a broadband connection. The network 565 transmits and receives data between the computer 501 and external systems. In an exemplary embodiment, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 501 is a PC, workstation, intelligent device or the like, the instructions in the memory 510 may further include a basic input output system (BIOS) (omitted for simplicity). The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the processor 505 is configured to execute instructions stored within the memory 510, to communicate data to and from the memory 510, and to generally control operations of the computer 501 pursuant to the instructions.

Figure 6:
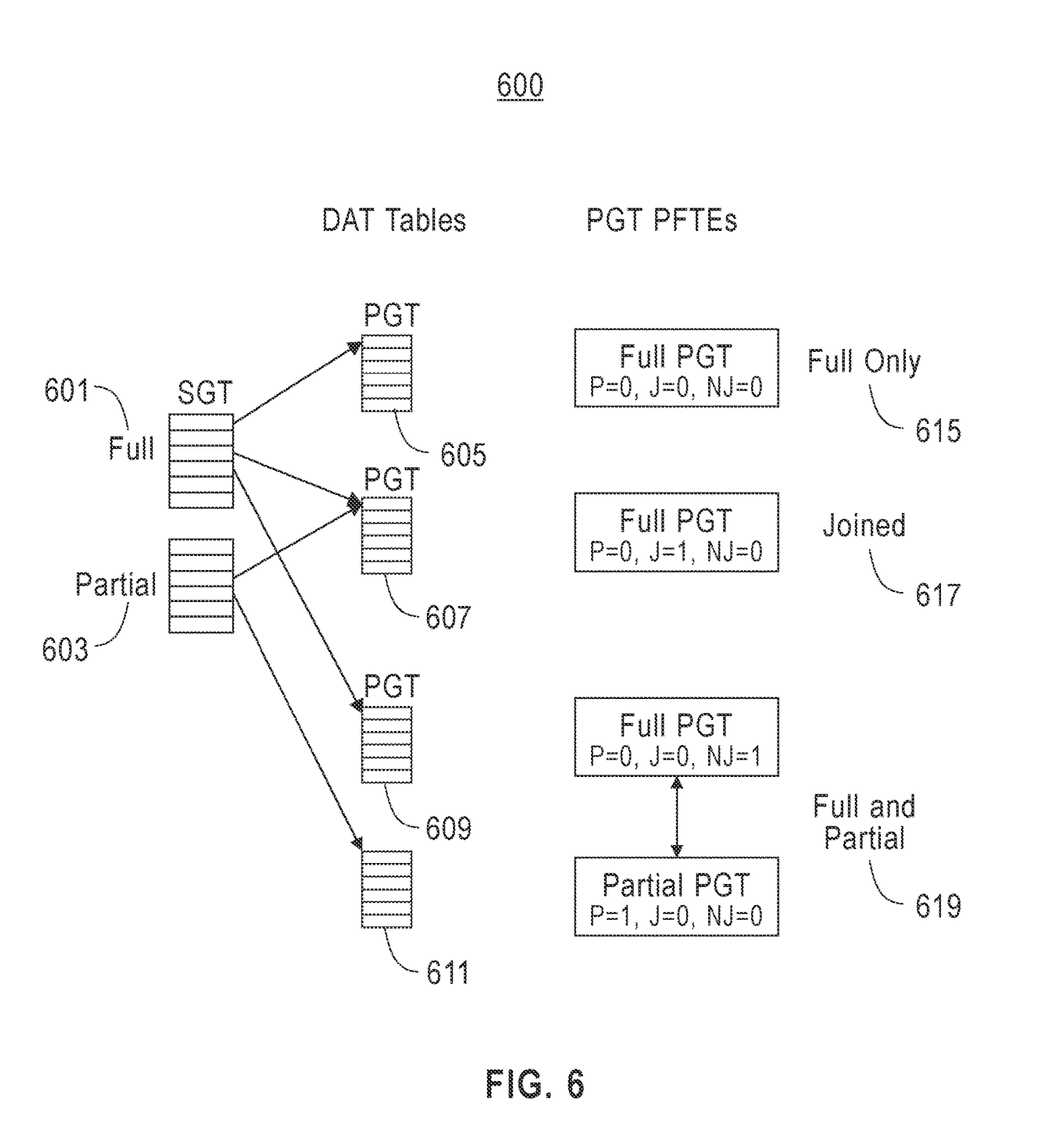
FIG. 6 illustrates another DAT structure according to one or more embodiments of the present invention.

Referring to FIG. 6, another DAT structure 600 is shown according to one or more embodiments of the present invention. The split DAT structure 600 shown in FIG. 6 includes a multi-level (radix-tree) structure showing a full SGT 601 and a partial SGT 603. The DAT structure 600 also includes a PGT full table 605, a joined PGT table 607, a PGT full table 609, and PGT partial table 611. Information regarding the DAT structure 600 may be maintained in an associated data structure, for example, in page frame table entries (PFTE). The PFTE 615 for the PGT full table 605 has the partial (P), joined (J), and not-joinable (NJ) bits all OFF (0). The joined PGT table 607 has it's PFTE 617 indicating that it is joined by having the joined (J) bit ON (1) while the partial (P) and not-joinable (NJ) bits are OFF (0). Accordingly, the PGT full table 609 and PGT partial table 611 have their PFTE 619 as follows: the PFTE 619 for the full PFTE has the not-joinable (NJ) bit ON (1), with the other bits OFF (0) and the partial PFT, which has the partial (P) bit ON (1) and the other bits OFF (0).

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Aspects of the invention are not limited in their application to the details of construction and the arrangement of the components set forth in the following description or illustrated in the drawings. The embodiments of the invention described herein are applicable to other embodiments or are capable of being practiced or carried out in various ways. The phraseology and terminology employed herein are for the purpose of description and should not be regarded as limiting. As will be appreciated by one skilled in the art, aspects of the present invention can be embodied as a system, method or computer program product.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   detecting, via a processor, that a context attribute of a storage has changed, data address translation (DAT) tables mapping virtual addresses to real addresses within the storage; and
   updating, via the processor, the DAT tables based at least in part on the context attribute of the storage that has been changed, the context attribute being associated with storage accessibility, the updating causing a structure of the DAT tables to change according to the context attribute that changed.

2. The method according to claim 1, wherein the DAT tables are dynamically separated based upon the context attribute of the storage that has been changed.

3. The method according to claim 1, wherein the context attribute of the storage indicates that not all of the DAT tables are mapped in the same way.

4. The method according to claim 2, wherein the separated DAT tables have page frame table entries to indicate they have separated.

5. The method according to claim 1, wherein the DAT tables are dynamically joined based at least in part on the context attribute of the storage.

6. The method according to claim 1, wherein the context attribute is based on privilege of the storage.

7. The method according to claim 1, further comprising joining the DAT tables based at least in part on determining that the context attribute of the storage is to create same real addresses.

8. A system comprising:
   a memory having computer readable instructions; and one or more processors for executing the computer readable instructions, the computer readable instructions controlling the one or more processors to perform operations comprising;
   detecting that a context attribute of a storage has changed, data address translation (DAT) tables mapping virtual addresses to real addresses within the storage; and
   updating the DAT tables based at least in part on the context attribute of the storage that has been changed, the context attribute being associated with storage accessibility, the updating causing a structure of the DAT tables to change according to the context attribute that changed.

9. The system according to claim 8, wherein the DAT tables are dynamically separated based upon the context attribute of the storage that has been changed.

10. The system according to claim 8, wherein the context attribute of the storage indicates that not all of the DAT tables are mapped in the same way.

11. The system according to claim 9, wherein the separated DAT tables have page frame table entries to indicate they have separated.

12. The system according to claim 8, wherein the context attribute is based on privilege of the storage.

13. The system according to claim 8, wherein the DAT tables are dynamically joined based at least in part on the context attribute of the storage.

14. The system according to claim 8, further comprising joining the DAT tables based at least in part on determining that the context attribute of the storage is to create same real addresses.

15. A computer program product comprising a computer readable non-transitory signal storage medium having program instructions embodied therewith, the program instructions executable by a processor to cause the processor to perform operations comprising:
   a memory having computer readable instructions; and one or more processors for executing the computer readable instructions, the computer readable instructions controlling the one or more processors to perform operations comprising;
   detecting that a context attribute of a storage has changed, data address translation (DAT) tables mapping virtual addresses to real addresses within the storage; and
   updating the DAT tables based at least in part on the context attribute of the storage that has been changed, the context attribute being associated with storage accessibility, the updating causing a structure of the DAT tables to change according to the context attribute that changed.

16. The computer program product according to claim 15, wherein the DAT tables are dynamically separated based upon the context attribute of the storage that has been changed.

17. The computer program product according to claim 15, wherein the context attribute of the storage indicates that not all of the DAT tables are mapped in the same way.

18. The computer program product according to claim 15, wherein the context attribute is based on privilege of the storage.

19. The computer program product according to claim 16, wherein the separated DAT tables have page frame table entries to indicate they have separated.

20. The computer program product according to claim 15, wherein the DAT tables are dynamically joined based at least in part on the context attribute of the storage.

* * * * *